United States Patent
Innerlohinger et al.

(10) Patent No.: US 8,827,192 B2
(45) Date of Patent: Sep. 9, 2014

(54) CELLULOSE SUSPENSION AND PROCESSES FOR ITS PRODUCTION

(75) Inventors: Josef Innerlohinger, Berg (AT); Heinrich Firgo, Vöcklabruck (AT); Helmut Schkorwaga, Attersee (AT)

(73) Assignee: Lenzing Aktiengesellschaft, Lenzing (AT)

( * ) Notice: Subject to any disclaimer, the term of this patent is extended or adjusted under 35 U.S.C. 154(b) by 353 days.

(21) Appl. No.: 12/679,227

(22) PCT Filed: Sep. 12, 2008

(86) PCT No.: PCT/AT2008/000323
§ 371 (c)(1),
(2), (4) Date: Sep. 9, 2010

(87) PCT Pub. No.: WO2009/036479
PCT Pub. Date: Mar. 26, 2009

(65) Prior Publication Data
US 2011/0028608 A1 Feb. 3, 2011

(30) Foreign Application Priority Data
Sep. 21, 2007 (AT) .................. A 1497/2007

(51) Int. Cl.
*B02C 1/00* (2006.01)
*B02C 11/08* (2006.01)
*B02C 21/00* (2006.01)
*B02C 23/00* (2006.01)
*B27K 7/00* (2006.01)
*B27K 9/00* (2006.01)
*B27L 11/00* (2006.01)
*D21D 1/30* (2006.01)
*B27N 1/00* (2006.01)

(52) U.S. Cl.
USPC .................. 241/21; 241/28; 162/91

(58) Field of Classification Search
USPC ....................... 241/21, 28; 162/91
See application file for complete search history.

(56) References Cited

U.S. PATENT DOCUMENTS

| | | | | |
|---|---|---|---|---|
| 3,974,251 A | * | 8/1976 | Cremer et al. | 264/194 |
| 4,179,416 A | * | 12/1979 | Smith | 524/36 |
| 4,474,949 A | * | 10/1984 | Chatterjee et al. | 536/56 |
| 5,269,470 A | * | 12/1993 | Ishikawa et al. | 241/21 |
| 5,725,821 A | * | 3/1998 | Gannon et al. | 264/203 |
| 6,042,769 A | * | 3/2000 | Gannon et al. | 264/203 |
| 6,495,190 B1 | * | 12/2002 | Yaginuma et al. | 426/615 |
| 6,645,409 B2 | * | 11/2003 | Feilmair et al. | 264/145 |
| 6,919,029 B2 | | 7/2005 | Meng et al. | |
| 7,067,444 B2 | * | 6/2006 | Luo et al. | 442/337 |
| 7,390,566 B2 | * | 6/2008 | Luo et al. | 428/393 |
| 7,399,377 B2 | * | 7/2008 | Crane et al. | 162/20 |
| 7,998,313 B2 | * | 8/2011 | Kokko | 162/157.1 |
| 8,172,165 B2 | * | 5/2012 | Tuovinen | 241/28 |
| 8,177,938 B2 | * | 5/2012 | Sumnicht | 162/146 |
| 2002/0148050 A1 | * | 10/2002 | Luo et al. | 8/115.51 |
| 2004/0265612 A1 | * | 12/2004 | Dohrn et al. | 428/532 |
| 2005/0085150 A1 | * | 4/2005 | Hamed | 442/417 |
| 2006/0000028 A1 | * | 1/2006 | Maruyama et al. | 8/129 |
| 2006/0283990 A1 | * | 12/2006 | Lucander et al. | 241/28 |
| 2007/0090209 A1 | * | 4/2007 | Schnell | 241/21 |
| 2007/0207692 A1 | * | 9/2007 | Ono et al. | 442/327 |
| 2008/0135193 A1 | * | 6/2008 | Kokko | 162/9 |
| 2009/0030131 A1 | * | 1/2009 | Fushitani et al. | 524/456 |
| 2009/0062523 A1 | * | 3/2009 | Malkki | 536/56 |
| 2011/0009259 A1 | * | 1/2011 | Innerlohinger et al. | 502/402 |
| 2011/0200783 A1 | * | 8/2011 | Kroner et al. | 428/91 |

FOREIGN PATENT DOCUMENTS

| | | |
|---|---|---|
| EP | 0 824 105 A2 | 2/1998 |
| WO | 99/36603 A1 | 7/1999 |
| WO | 99/36604 A1 | 7/1999 |
| WO | 02/057319 A2 | 7/2002 |

OTHER PUBLICATIONS

Gooding et al. Journal of Pulp and Paper Science, 27(12), 2001, 423-428.*

* cited by examiner

*Primary Examiner* — Liam J Heincer
(74) *Attorney, Agent, or Firm* — Fitzpatrick, Cella, Harper & Scinto

(57) ABSTRACT

The present invention relates to cellulosic particles, a suspension of cellulosic particles and a process for the production of a suspension of cellulosic particles, whereby the cellulosic material is never dried between the dissolution of the cellulose and the disintegration of the suspended cellulose fibers.

14 Claims, 2 Drawing Sheets

CELLULOSE SUSPENSION AND PROCESSES FOR ITS PRODUCTION

BACKGROUND OF THE INVENTION

1. Field of the Invention

The present invention relates to cellulosic particles, a suspension of cellulosic particles and a process for the production of a suspension of cellulosic particles, whereby the cellulosic material is never dried between the dissolution of the cellulose and the disintegration of the suspended cellulose fibers.

2. Description of Related Art

Dry cellulose powders are commercially available in various sizes and are used in a number of different applications, such as for example as auxiliary filter materials, additives and auxiliary materials in food stuffs and pharmaceutical products, chromatography materials as well as in the form of additives in the building material trade. The greater part, which is extracted from pulp, wood or one-year plants, is accounted for by fibrous cellulose-I-powder. In this respect the lower limit of the fiber length of this fibrous cellulose powder is limited to 10-20 μm. In the upper range fiber lengths are used in the mm range whereby there is already some overlapping with short-cut fibers.

In smaller quantities cellulose-II-powder can also be found whereby spherical powder can be found in addition to fibrous powder. These powders are mainly made by the precipitation of dissolved cellulose in suitable precipitants. Spherical cellulose powders in the size range below 10 μm can only be made with much more effort and are thus difficult to find on the market.

For example WO 02/57319 describes the production of cellulose pearls using the NMMO-process whereby large amounts of various additives are added to the cellulose solution prior to forming, such as for example titanium dioxide or barium sulphate as well as materials which provoke ion exchange. The products obtained can be used as ion exchangers or catalysts.

The production of a titanium oxide suitable as an ion exchange material, for example for waste water purification, is described in U.S. Pat. No. 6,919,029. Particularly high absorption capacities and speeds are attained with this material by means of the fact that the titanium oxide material is activated by a special treatment on the surface. This titanium oxide material can be described as a "substoichiometric titanium oxide". This means that the ratio of the oxygen atoms to the titanium atoms in the material is smaller than 2. For a more detailed description of this surface activation, reference is made to the description in U.S. Pat. No. 6,919,029.

Other possibilities for the production of particular functionalized titanium oxides can be found in the so-called "doping" of titanium oxide with iron and sulphur atoms. These compounds display a photocatalytic activity.

Cellulosic materials in the mm range are likewise being given greater attention recently. In this respect one can differentiate between the rigid crystalline Whiskers (de Souza Lima, M. M. and R. Borsali, Macromolecular Rapid Communications, 2004. 25: p. 771-787) and the flexible MFC (Microfibrillated Cellulose) (Herrick, F. W. et al, Journal of Applied Polymer Science; Applied Polymer Symposium, 1983. 37: p. 797-813) and also (Turbak, A. F. F. W. Snyder and K. R. Sandberg, Journal of Applied Polymer Science; Applied Polymer Symposium, 1983. 37: p. 815-827). Both particle types are smaller in the size range of around 1 μm and are in the form of suspensions or gels with only a slight cellulose content due to their production process. Production is done largely via one or several mechanical disintegration steps (ultrasound, homogenizer, etc.) in combination with a strong degradation of the cellulosic starting material via enzymes or strong acids.

Likewise, cryo processes are described in the literature with the help of liquid nitrogen to release micro-fibrils of cellulosic materials (Chakraborty, A. M. Sain, and M. Kortschot, Holzforschung, 2005. 59: p. 102-107).

An alternative method for the production of cellulose nano-fibers is the electro spinning process (Kulpinski, P., Journal of Applied Polymer Science, 2005. 98 (4): p. 1855-1859) which also demands a great deal of effort.

The main field of application for these nano-structured materials is currently above all the reinforcement of compound materials (Favier, V., H. Chanzy and J. Y. Cavaillé, Macromolecules, 1999. 28: p. 6365-6357).

In the literature, films or membranes are described as another special application of the cellulose particles described above. Often the cellulosic materials used in combination with other substances and/or the production of the films demands a great deal of effort. Examples can be found in (Fendler, A., et al. Characterization of barrier properties of composites of HDPE and purified cellulose fibers. Cellulose, 2007. In press. Doi. 10.1007/s10570-007-9136-x), Liu, H. and Y.-L Hsieh, Ultrafine Fibrous Cellulose Membranes from the Electrospinning of Cellulose Acetate. Journal of Polymer Science: part B: Polymer Physics, 2002.40:p. 2119-2129) or (Sanchez-Garcia, M. D. E. Gimenez and J. M. Lagaron, Morphology and barrier properties of solvent cast composites of thermoplastic biopolymers and purified cellulose fibers, Carbohydrate Polymers, 2007 in press. doi: 10.1016/j.carbpo1.2007.05.041).

SUMMARY OF THE INVENTION

Compared to the known state of the art, the task of the present invention was, therefore, to produce cellulose fibrids which fill the gap in the available particle sizes between the nano-materials suspended in a suspension medium such as for example Whiskers of MFC in the range smaller than 1 um and the conventional dry powders in the range between 10 μm to some mm and thereby demonstrate an enhanced economic efficiency.

Moreover, the production process should be characterized by its simple execution and preferably should work without the strong degradation of the cellulosic material via enzymatic or chemical treatment (above all strong acids) of the starting material since this would involve the elaborate cleaning of the product. Likewise it should be possible to produce more highly concentrated (~10% solid substance) suspensions of the fibrids produced which can moreover also be readily processed.

It was possible to solve this task via a process for the production of a suspension of cellulosic particles involving the following steps:

Dissolving cellulose to obtain a spinning solution comprising cellulose,

Extruding the solution containing the cellulose,

Precipitating the cellulose wherein cellulose fibers are obtained,

Cutting the precipitated cellulose fibers,

Suspending the cut cellulose fibers and

Disintegrating the suspended cellulose fibers, wherein the cellulosic material is never dried between the dissolving of the cellulose and the disintegrating of the suspended cellulose fibers.

With this process, cellulosic particles with excellent properties can be obtained with a reduced number of process steps, shorter overall retention times in the process and a reduced need for energy compared to the present state of the art.

DETAILED DESCRIPTION OF THE INVENTION

Figure 1:
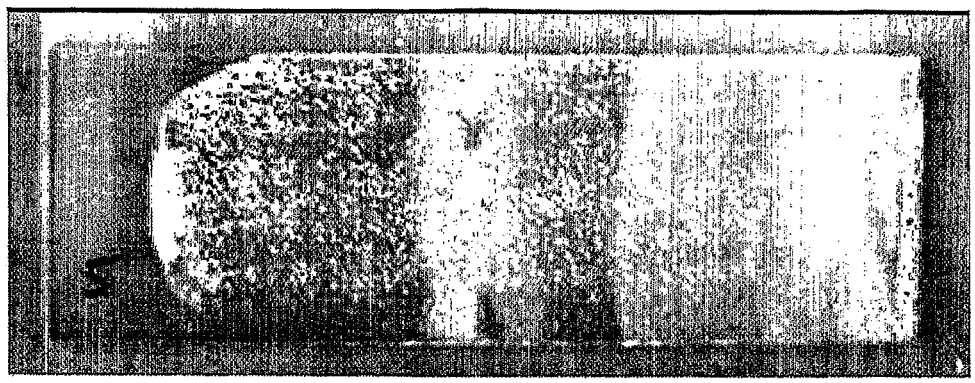
FIG. 1 shows a film which was made of commercially available dry cellulose powder by suspending, spreading the suspension onto an object slide and finally drying it. The film is very coarse-grained and inhomogeneous as can be readily seen with the naked eye.
Figure 2:
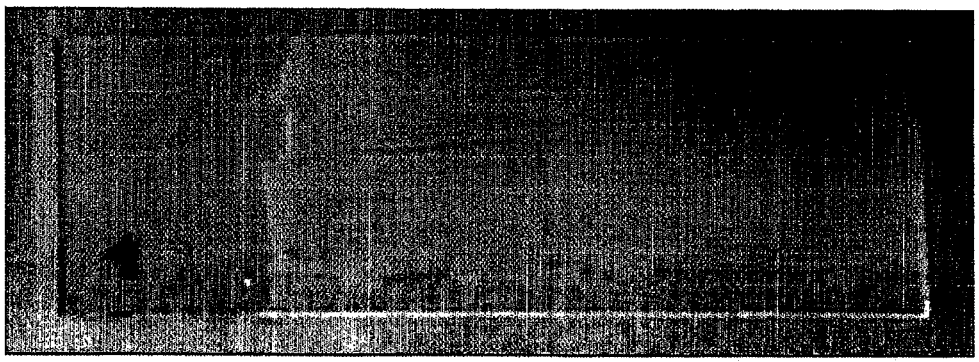
FIG. 2 shows a film which is produced by spreading a suspension in accordance with the invention onto an object plate of glass and subsequent drying. This film is very homogeneous as can be seen with the naked eye.
Figure 3:
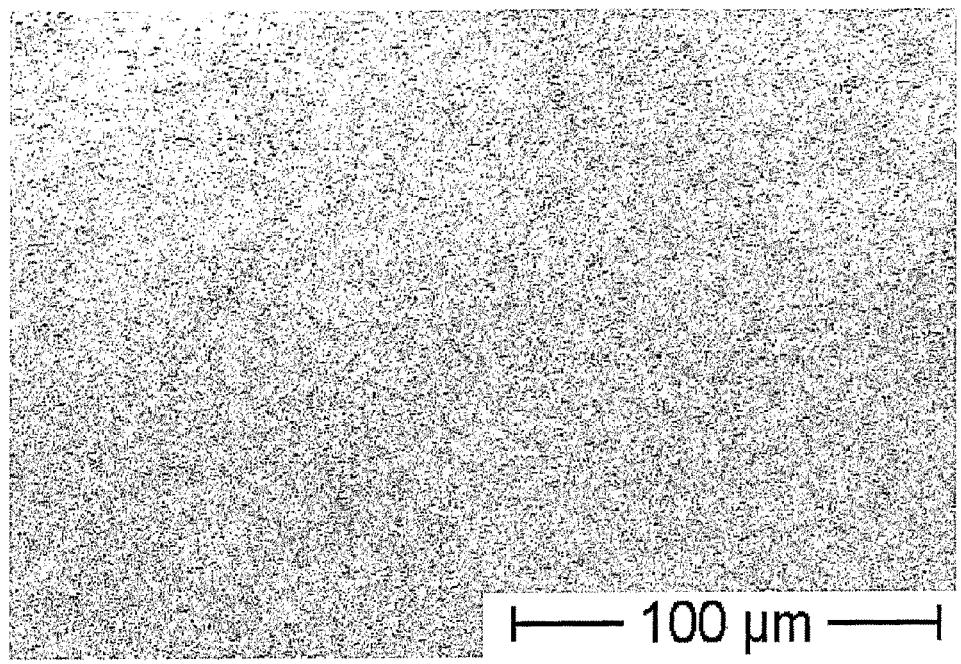
FIG. 3 shows the film of FIG. 2 produced from the suspension in accordance with the invention under the electron microscope. In this magnification it can also be seen that the film is very homogeneous.

In a preferred embodiment, the cellulosic material has a moistness of about at least 50% and preferably of about at least 100% and most preferably of about at least 150%. For this reason care has to be taken that the cellulose does not dry out even during further processing, particularly during disintegration, and the process steps in between i.e., always has a sufficiently aqueous phase.

Compared to the state of the art, cellulose particles and suspensions which contain these particles can be produced with the process according to the invention, which have comparable properties and fields of application to the well-known smaller nano-particles but which can be produced at a more favorable price. An additional economic advantage is that the suspensions made in accordance with the invention can display much higher cellulose contents, namely up to about 20 weight percentage instead of only about 2 weight percentage as is the case with the nano-materials. In this way, the packaging and transportation costs drop and likewise the use of the suspensions become more favorably priced because, for example, less suspension medium has to be removed to obtain a film of the cellulose particles.

The production of cellulose fibers on the basis of Lyocell technology is well known and state of the art. It is fundamental for the production of fibrids of fibers in accordance with the invention, that the fibers are not dried during the process and display a correspondingly high moisture content (at least 50%, preferably at least 100% and most preferably at least 150%).

The best known solvent already being used on a commercial scale in Lyocell technology is aqueous N-methyl morpholine-N-oxide (NMMO). However other well-known solvents, in which cellulose is physically dissolved without chemical derivatization, are both suitable and economical for the production of cellulosic fibers in accordance with the present invention. In particular the dissolution in so-called "ionic liquids" or in other amine oxide containing solvents should be named. In the same way the well known viscose processes are suitable and economical for the implementation of the present invention in which the cellulose is xanthated in a medium containing caustic soda and thereby dissolved, the spinning solution containing cellulose produced in this way is then extruded and finally precipitated in a precipitation bath and regenerated.

Auxiliary materials can be applied to the moist fibers (e.g., stearic acid-PEG-ester, partly sulphated fatty alcohols and fatty alkyl ethophosphate) which alleviate further processing, for example, to improve the grinding ability.

The moist fiber cables are cut by conventional means to a staple length of about 2-60 mm. Starting with these initially moist (short-cut) fibers, further processing takes place. When producing the fibers, the properties of the fibrids obtained at the end can be determined in part. To this end the measurements known to specialists, for example, are suitable which would lead to an influencing of the fiber titer, fiber tenacity, elongation or loop strength if conventional textile fibers were to be produced. Measurements of this kind are among other things the corresponding selection of pulp with respect to the spinning conditions. While the fiber titer particularly has an effect on the particle size, the brittleness and fibril tendency can be influenced by the fiber tenacity. More brittle fibers which fibrillate more easily can be ground more readily since the duration of grinding is shorter, less energy has to be used for grinding and the thermal load of the particles when grinding is also reduced.

The fibers are suspended in water or in a suitable other medium whereby this suspension is homogeneous and should be free-flowing and pumpable. A fiber content in a range of about 4-6% abs.dry, i.e., in relation to absolutely dry cellulose, has proved to be best suited. The suspending is performed via suitable mechanical aggregates whereby in addition a fibrillation of the fibers can also occur. A fibrillation, i.e., the separation of individual fibrils from the fiber surface leads to a higher share of smaller cellulose particles in the suspension due to the fine fractions which are produced in this way. A fine-grain fraction of this kind can be either desired or undesired depending on the properties targeted in the end product. For this reason, the suspending aggregate must be selected accordingly.

Several variants are possible for the further process steps:

In the first variant, the fibers are first of all only suspended wherein their size remains largely unchanged. Finally they are broken down in a disintegration step to the desired final size.

In a second variant, the fibers are already disintegrated during suspending and then finally broken down to the final size desired in a concluding disintegration step. In a third variant, the fibers are already broken down to the desired final size during suspending.

In a fourth variant it is possible to separate the water from the fibers after cutting and to disintegrate these moist fibers without any surrounding liquid in a cutting mill, a high consistency mill or a shredder and then suspending them and breaking them down to the desired final size.

In general it can be said that most devices, which are used in pulp disintegration during preparation, are also suitable for the production of a fiber suspension in accordance with this invention. The following devices have proved to be suitable for the suspension of the fibers: Ultra Turax with a cutting head, a Jokro mill, a Valley Beater and a Refiner.

In a preferred embodiment of the process in accordance with the invention, the fibers are disintegrated at the same time as being suspended. In this respect suspending devices are suitable of the kind which break the fibers down to a length in the range of between about 100 µm and about 600 µm at the same time as suspending. This length is particularly well suited to further disintegration.

In another preferred embodiment of the process in accordance with the invention, disintegration to a particle size of about 1 to about 5 µm takes place following suspending. The disintegration is preferably a wet grinding.

Disintegration is preferably performed with a cellulose content of between about 0.1 and about 5.0 weight percentage in the suspension. With lower cellulose contents, in relation to the quantity of cellulose particles, the mills required are too big and consequently too high an amount of suspension medium may have to be removed after disintegration. When the cellulose content is too high, the viscosity of the suspension becomes too high and too much shearing energy is introduced through the grinding movement.

Here, as well, it is possible to add additives to support the disintegration and/or stabilization of the fibrids in the surrounding medium. Wet grinding takes place in mills with which the desired final fineness (about 1-5 μm) can be obtained. These are preferably different agitator bead mills (impeller stirrers, pin stirrers, etc.). Other mills such as (double) conus mills can also be used but may be less preferable.

To achieve the desired particle properties, in particular the final fineness, it is in general necessary to circulate the suspension in a closed loop during the wet grinding so that the ground stock can pass through the mill several times. The fineness can thus be controlled via the duration of grinding and at the same time it is possible to influence the particle size via other parameters. Thus, the size of the grinding media or the speed of the mill can be adjusted.

Following grinding, a classification of the fibrids is required using a wet classifier for example of the type Hosokawa-Alpine Hydroplex when a very narrow distribution is desired.

At the end of grinding, the fibrids are in the suspended medium with a length of about 1-5 μm and a diameter of about 100-500 nm in a concentration of about 1.1-5 weight percentage. In this respect both individual fibrids as well as interconnected fibrid-bonds can be found. The fibrids sediment depending on their size and the type of stabilization.

To stabilize the suspension, if this is desired, measures can be used which cause the suspension to thicken. This can either be done by removing a small share of the suspension medium, for example via centrifuging, evaporation at gentle temperatures or membrane separation processes or by adding thickening agents. Suitable thickening agents are known to the expert, for example commercially available carboxymethylcellulose or gylcerin. The use of dispersion agents or tensides as surface-active substances may also stabilize the suspension. This is not, however, a preference because it introduces another class of substance to the suspension in contrast to the polymer or polymer-like thickening agents.

But even if the cellulose particles in accordance with the invention sediment in the suspension, no aggregation generally occurs and the fibrid deposition can be easily shaken out again. As a result of this sedimenting in connection with decanting the excess, the concentration of the fibrids in the suspensions can also be increased. Other methods to increase the concentration of solids are to centrifuge and evaporate the liquid phase. In this respect, however, care should be taken that the suspensions are not thickened too much otherwise this will lead to irreversible aggregations of the fibrids. The upper limit of the solid content in the suspension depends on the fibrid size and, for fibrids, this equals around several μm with 15-20% of dry substance in the suspension.

The particles can be obtained from suspensions in accordance with the invention as a result of spray drying. Processes and devices for spray drying are basically known to experts. It is, however, surprising that the suspensions in accordance with the invention can still be sprayed without any difficulty even with exceptionally high particle contents. Suspensions with particles which are state of the art with contents of a maximum of 2 weight percentage cannot be readily sprayed because they display high viscosities and a non-Newtonian flow behavior which can be problematic in the spraying ducts.

In spray drying the individual fibrids do in fact remain intact but they lose their characteristic properties. Spray drying would, however, be interesting to obtain very fine cellulose powders which are not accessible via dry grinding.

In accordance with the invention additives which remain on or in the cellulosic particle can be included in the process. In this way additional functional properties can be conveyed on the particles whereby, surprisingly, the good processing properties of the suspension remain intact. These additives are not removed during the treatment in the wet state in accordance with the invention such as for example washing out, suspending and disintegration, but rather they remain in the cellulose particles. The additives can be contained in quantities of between about 1 and about 200 weight percentage in relation to the cellulose amount on or in the particle.

These additives can be already added to the cellulosic spinning solution before it is precipitated. They can for example be selected from the group consisting of pigments, inorganic substances such as for example titanium oxide, such as substoichiometric titanium oxide, barium sulphate, ion exchangers, polyethylene, polypropylene, polyester, activated carbon, soot, zeolites, polymer superabsorbers and flame-retardant agents.

In the same way additives can be applied to the precipitated cellulose fibers before or after cutting. Suitable devices for this are known to the expert.

Additives can also be included before, during or after the disintegration procedure in the suspension in accordance with the invention. In this case these are mainly distributed on the surface such as in the outer layers of the cellulosic particles. In this case additives can for example be finishings, dyestuffs or cyclodextrins. In this way, the processing properties in the process in accordance with the invention are influenced or, accordingly, the functional properties of the particles such as, for example, a higher absorption capacity for certain substances are achieved.

The subject matter of the present invention is also a suspension comprising from about 0.01 to about 20 weight percentage and preferably from about 0.1 to about 10 weight percentage of cellulosic particles produced according to the invention whereby the cellulosic particles were never dried during their production. They form a homogeneous film when drying from the mother suspension. The production of this suspension can take place according to the process described above in accordance with the invention. Until now it has not been possible to find a physical characterization method which records the unique properties of this suspension and the particles contained in it. The suspension in accordance with the invention can, however, clearly be recognized by the film formation behavior described here which is unique for a suspension of cellulosic particles. Cellulosic particles known until now form homogeneous films only when deliberately applying elevated temperatures, pressures or additional solvents (see for example Endo et al., Polymer Journal (32) 2, 182-185 (2000).

The basic characteristic of the fibrids described is that they are extracted from the cellulose solution and are sufficiently moist throughout the entire production process. Therefore we are dealing with so-called never-dried particles. Without being bound by any theory, it is believed that the process in accordance with the invention avoids or reduces irreversible hydrogen bridges between the OH groups of the cellulose molecules. For this reason the suspensions described tend to form a homogeneous, dense film when drying up since the OH groups can still freely arrange themselves.

If one dries the fibrids, introduces them to the suspension again and then dries them, this results in a film which is in fact not so homogeneous but clearly more coarse-grained and which has a higher tendency to form cracks. The dried up fibrids behave like commercially available dry cellulose powder when one uses them to form film from the suspension.

Cellulosic particles with a water content of 80 to 99.9 weight percentage are also the subject matter of the present invention. These are characterized in that they are not dried during their production. They form a homogeneous film when drying up from the mother suspension.

The particles described herein can, as has already been described above, contain a large share of additives. The additives can be included in a quantity of between about 1 and about 200 weight percentage in relation to the cellulose amount in the particles whereby they can be distributed either in the overall particle or mainly on the surface of the particle such as in the outer layers of the particle.

Another object of the invention is the use of cellulosic particles with a water content of about 80 to about 99.9 weight percentage produced using the process described above to produce homogeneous films.

An advantage of the use of the fibrids according to the invention for film formation is, in comparison to the process described above from the state of the art, its very simple execution. The production of films is done simply via the gentle drying of the fibrid suspension. In addition, pressure and temperature can also be applied when forming the films. A higher temperature accelerates the drying. This is done, for example, by blowing with heated gas, radiant heat or direct contact with heated surfaces.

The application of a higher pressure produces, in particular, a denser film and is, for example, attained by pressing between flat surfaces or rolls.

In the following, preferred embodiments of the invention are described using examples. The invention is, however, not restricted to these embodiments but rather also encompasses other embodiments which are based on the same inventive concept.

The size of the particle was determined using a laser diffraction measuring apparatus.

Example 1

According to what is basically a well known process using NMMO, 6 mm long Lyocell fibers with an individual fiber titer of 1.3 dtex were produced. In this respect the spinning solution was extruded in a dry-wet spinning process first of all through an air gap into a precipitation bath, the gel threads formed were drawn out of the precipitation bath and then cut following a washing step in a wet condition. After cutting, the fibers suspended in the water were ground in a Valley Beater (Lorentzen & Wettre). The suspension thereby contained 2.5% cellulose and the grinding duration equalled 150 min. The second grinding took place in a agitator bead mill from Drais Werke manufacturers with a 1000 ml milling space volume and with zirconium oxide balls with a diameter of 0.9-1.1 mm for three hours at 2000 rpm and then for another hour at 3000 rpm. The suspension obtained in this way was finally thickened for 15 hours at 60° C. in the drying cabinet to 7% cellulose. The suspension was viscous and there was no phase separation even after a long period of standing. It was possible to dilute the suspension again with water without any problems to a lower cellulose content. As a result of thickening (and diluting) the suspension, no noticeable (irreversible) aggregation of the fibrids occurred. The length of the fibrids was in the range of 1-8 µm (laser diffraction, microscopy).

Example 2

8 g of cut, moist fibers (cellulose content 30% abs.dry) from example 1 (6 mm, 1.3 dtex) was mixed into 60 ml of water using a glass stirrer. This suspension was emptied together with 300 g of zirconium oxide balls (1, 1-1.4 mm diameter) into a stainless steel glass. With an impeller stirrer (IKA RE 166) the suspension was ground for 2 hours at 300 rpm. The grinding balls were separated from the fibrid suspension using a sieve. The fibrids were longer than those in example 1. There were indeed also fibrids with a length of 1 µm, however, the mean value of the length was at around 10 µm and fibrids with a length of up to 40 µm could be found.

Example 3

15 g of non-finished, non-dried viscose fibers (1.3 dtex, 38 mm cut length) from a commercial production line with a cellulose content of 35% (abs.dry) were pre-disintegrated and broken into a fibrous state in a laboratory mixer with a Stern knife. 2 g of fibers were dispersed from the sample pre-treated in this way by stirring into 80 ml of water using a glass stirrer. This suspension was mixed with 300 g of zirconium oxide balls (0.9-1.1 mm diameter) in a stainless steel beaker glass and finally ground for a long time with an impeller stirrer (IKA RE 166) at 3000 rpm for 3 hours. The separation of the grinding balls from the fibrid suspension was performed by a sieve. The fibrids obtained were of a size comparable to those in example 1 with lengths in the range of 2-12 µm (laser diffraction).

What is claimed is:

1. A process for the production of a suspension of cellulosic particles comprising dissolving cellulose to obtain a spinning solution containing cellulose, extruding the solution containing cellulose, precipitating the cellulose whereby cellulose fibers are obtained, cutting of the precipitated cellulose fibers, suspending the cut cellulose fibers and disintegrating the suspended cellulose fibers, wherein the cellulose, cellulose fibers and cut cellulose fibers are never dried between the dissolving of the cellulose and the disintegrating of the suspended cellulose fibers, wherein the disintegrated suspended cellulose fibers have a length of about 1 to about 40 µm.

2. The process according to claim 1, wherein the cellulose, cellulose fibers and cut cellulose fibers have a moistness of about at least 50% through the disintegrating step.

3. The process according to claim 2, wherein the cellulose, cellulose fibers and cut cellulose fibers have a moistness of about at least 100% through the disintegrating step.

4. The process according to claim 2, wherein the cellulose, cellulose fibers and cut cellulose fibers have a moistness of about at least 150% through the disintegrating step.

5. The process according to claims 1, 2, 3 or 4, wherein the fibers are disintegrated at the same time as suspending.

6. The process according to claim 5, wherein the fibers are disintegrated to a length in the range of between 100 µm and 600 µm during the suspending.

7. The process according to claim 6, wherein the disintegration of the suspended cellulose fibers is by wet grinding, and wherein the disintegrated suspended cellulose fibers have a length of about 1 to about 5 µm.

8. The process according to claims 1, 2, 3 or 4, wherein the disintegration of the suspended cellulose fibers is by wet grinding.

9. The process according to claim 1, further comprising wet grinding during a step of disintegrating of the suspended cellulose fibers wherein the suspended cellulose fibers are circulated in a closed loop during the wet grinding.

10. The process according to claim 1, wherein the fibers are classified in a wet classifier following disintegration.

11. The process according to claim 1, wherein the disintegration is performed with a cellulose content of between about 0.1 and about 5.0 weight percentage in the suspension.

12. The process according to claim 1, wherein additives are included which remain on or in the cellulosic particle.

13. The process according to claim 1, wherein between about 1 and about 200 weight percentage additives are added to the cellulose solution prior to precipitation in relation to the cellulose amount, and wherein the additives are selected from the group comprising pigments, titanium oxide, such as substoichiometric titanium oxide, barium sulphate, ion exchangers, polyethylene, polypropylene, polyester, active carbon, active coal, polymer superabsorbers and flame-retardant agents.

14. The process according to claims 1, 2, 3 or 4, wherein the disintegrated suspended cellulose fibers have a length of about 1 to about 5 μm.

\* \* \* \* \*